(12) United States Patent
Draganoff

(10) Patent No.: US 6,320,957 B1
(45) Date of Patent: Nov. 20, 2001

(54) TELEPHONE DIALLER WITH EASY ACCESS MEMORY

(75) Inventor: Georgi H. Draganoff, Mississauga (CA)

(73) Assignee: GEZ Microsystems, Inc., Toronto (CA)

( * ) Notice: Subject to any disclaimer, the term of this patent is extended or adjusted under 35 U.S.C. 154(b) by 0 days.

(21) Appl. No.: 08/947,841

(22) Filed: Oct. 9, 1997

Related U.S. Application Data

(63) Continuation of application No. 08/585,886, filed on Jan. 16, 1996, now abandoned, which is a continuation of application No. 08/265,951, filed on Jun. 27, 1994, now Pat. No. 5,541,988, which is a continuation-in-part of application No. 07/878,987, filed on May 6, 1992, now Pat. No. 5,359,651.

(30) Foreign Application Priority Data

May 8, 1991 (CA) .................................................. 2042068

(51) Int. Cl.[7] ..................................................... H04M 1/00
(52) U.S. Cl. ............... 379/354; 379/355.09; 379/357.04; 379/93.23
(58) Field of Search ............................... 379/354, 355.01, 379/355.02, 355.05, 355.09–356.01, 357.04, 93.18, 93.23, 100.14

(56) References Cited

U.S. PATENT DOCUMENTS

| | | | |
|---|---|---|---|
| 4,117,542 | 9/1978 | Klausner et al. | 364/900 |
| 4,278,845 | 7/1981 | Chiou | 379/355 |
| 4,304,968 | 12/1981 | Klausner et al. | 379/69 |
| 4,440,977 | 4/1984 | Pao et al. | 379/97 |
| 4,511,764 | 4/1985 | Nakayama et al. | 379/354 |
| 4,532,378 | 7/1985 | Nakayama et al. | 379/110 |
| 4,661,976 | 4/1987 | Basch | 379/354 |
| 4,800,582 | 1/1989 | D'Agosto, III et al. | 379/216 |
| 4,825,464 | 4/1989 | Wen | 379/354 |
| 4,839,919 | 6/1989 | Borges et al. | 379/96 |

(List continued on next page.)

FOREIGN PATENT DOCUMENTS

| | | | |
|---|---|---|---|
| 57004639A | 11/1982 | (JP) | H04M/1/57 |
| 63-80652 | 4/1988 | (JP) | |

OTHER PUBLICATIONS

Motorola, *cellular portable telephone user's manual*, 1990, pp. 1–7.

Primary Examiner—Wing F. Chan
(74) Attorney, Agent, or Firm—Cook, Alex, McFarron, Manzo, Cummings & Mehler, Ltd.

(57) ABSTRACT

An advanced telephone dialler has been described, incorporating a fast retrieval and dial telephone directory. The system simplifies the use of the telephone directory by using a single sliding or rotary key for scanning and selection of the name and number to be dialled and one button for speed dialling of the selected number. The name and telephone number of the selected person are simultaneously displayed on a character display and a normal telephone keypad has been used for entering both letters for the name and digits for the number into telephone directory's memory. A short cut dialling has been also provided by simply using the sequential order number of the person to be dialled from the telephone directory's memory. An option has been provided for checking the incoming calls numbers with the telephone directory of the system and not only displaying the name of the calling person and its number if they have been found in directory. In addition the telephone directory memory is divided into pages each page having its own access code and the option to be locked or unlocked. If a selected page has been locked the access is denied unless a proper access code for this page has been entered. In the case of the calling number identification feature, in addition to the name of the calling person if it is in the memory, the system displays the name of the person to whom the page, where this number resides, has been assigned. The application is targeted for heavy traffic business or personal phones, family telephones, cellular phones and as a part of an office or home automation system.

44 Claims, 7 Drawing Sheets

U.S. PATENT DOCUMENTS

| | | | |
|---|---|---|---|
| 4,924,496 | 5/1990 | Figa et al. | 379/355 |
| 4,982,423 | 1/1991 | Muroi | 379/354 |
| 5,067,150 | 11/1991 | Satomi et al. | 379/354 |
| 5,163,050 | 11/1992 | Cromack | 379/88 |
| 5,359,651 * | 10/1994 | Draganoff | 379/355 |

* cited by examiner

TELEPHONE DIALLER WITH EASY ACCESS MEMORY

This application is a continuation of U.S. application Ser. No. 08/585,886, filed on Jan. 16, 1996 abandoned which is a continuation of application Ser. No. 08/265,951 filed on Jun. 27, 1994 (now U.S. Pat. No. 5,541,988), which is a continuation-in-part of application Ser. No. 07/878,987, filed May 6, 1992 (now U.S. Pat. No. 5,359,651).

BACKGROUND OF THE INVENTION

There are many different telephone sets with autodialling and stored telephone directory. They normally have some kind of memory for storing preselected and frequently called telephone numbers and usually every one of those numbers has a corresponding push-button. This kind of arrangement is very inconvenient if a large number of telephone numbers is stored as far as a separate push-button is required for each number. Also, additional information such as name and/or address can not be conveniently associated with push-buttons.

To assist in identifying the telephone numbers that are stored in the respective memory location, paper tabs, or inserts are juxtaposed the respective keys, and it is expected that the user will write onto each paper tab the name of the individual whose telephone number is stored in the associated memory locations.

It has been proposed in Can. Pat. 1,266,930 (pg. 1, ln. 24 . . . ):" . . . a hybrid alphanumeric directory comprising a portable note book having a plurality of bound pages, which can be opened to expose a desired page, each page having a plurality of writing areas in the same relative positions where alpha-numeric information can be entered; and an electronic unit comprising a receiving surface on which said note book can be placed, a plurality of actuators associated with said respective relative positions when said note book is placed on the receiving surface . . . means, for indicating which page is exposed and means responsive to an output from said indicating means to associate said actuator with the respective data associated with the writing areas of the exposed page." This way the number of actuators (push-buttons) has been reduced, but there is additional operation to find the right page and also there is no feedback to show that the selected number is the desired one.

In some telephones with autodialling memory the number is displayed on alpha-numeric display during its entry into memory and also during dialling, so it could be verified. Even it has been proposed in U.S. Pat. No. 4,341,929 to display in addition to a numerical telephone number, alphabetic characters representing the name of the individual associated with that telephone number.

Thus both the name and the telephone number are stored and displayed. However, in this proposal, a separate alpha-numeric character keyboard is provided for the purpose of entering signals representing names.

SUMMARY OF THE INVENTION

The subject matter of the present invention relates generally to advanced use of the telephone directory in a telephone system for improved human interface and better access, retrieval and use of the data stored in this directory. At the same time the organization of the telephone directory into pages with the option of individual access to each page, allows for better utilization of the telephone directory and creation of a number of personalized subdirectories with individual access.

The telephone dialler according to the invention provides an easy and fast access to the stored telephone directory through repositioning of a single sliding or rotary control, which depending on its position causes the associated address generator to generate an address, used to retrieve the necessary telephone number and associated with it additional information. Moving this control permits easy scanning of the contents of the telephone directory memory and by displaying it on an alpha-numeric display easy location of the desired number. The depressing of another button performs the autodialling of the selected this way number.

In addition to the dialled number, additional alpha-numeric information, like the name of the called person is displayed on the display thus permitting easy verification.

A standard telephone dialler keypad is used for entering the numbers and as well as the letters, but the keypad is allowed to enter alphabetic characters only during "name" programming mode and behaves in all other modes as a standard telephone dialling keypad.

In addition to the scanning mode, "shortcut" and "manual" modes are also available. The "shortcut" dialling means that just dialling the sequential number of the person to be called as it is stored in the telephone directory memory is enough. This feature is very useful for numbers, which are frequently used, and the caller knows their position numbers in telephone memory.

The keypad permits in "name" programming mode (the mode when the additional alphanumeric information is entered into telephone memory) to enter a full set of ASCII characters by multiple depressings of a button. For example for entering the letter "B" the button "2" on the keypad should be depressed 3 times in a row and then depressing the button "enter" will cause the ASCII code corresponding to this letter to be stored in memory. This way the need for an alpha-numeric keyboard with all its complexity and cost is avoided.

The ready availability of the additional alpha-numeric information in telephone memory is not only indispensable in medium to large autodialling directories, for identification and verification purposes during dialling, but it also ensures such advanced features as "who is calling" information (service provided by some North American companies), if the telephone number of the caller exist in the directory not only the number is displayed but also the name of the caller, this last in combination with an answering machine could keep track for all incoming calls.

The telephone directory is organized in pages; for example 9 pages, each containing 16 telephone number entries with corresponding names.

In order to make the telephone directory to serve different people, for example different members of a family, each page can be locked by its own access code. This will allow each member of the family, as in the example, to have his/her own directory not accessible by the others. At the same time some of the pages, which are not locked by an "access code" are available for scanning by everyone and when the page change button switches to this page the display will show the numbers and names contained in this page. If the page change button switches to a page which has been locked by an access code the display will display the name of the "owner" of the page and request an access code entry for this page. This will make it possible to have a common telephone serving several people and having an open and several personalized telephone directories With a telephone directory memory organized in pages, during "programming" mode the dialler first prompts to enter the identifier of the page, where the telephone number to be programmed, will reside. The identifier could be either the sequential number of the page, or the additional alphanumeric page identifier. If the page has been locked, the dialler will next issue a prompt to enter the proper access code for this page.

There is also a code word called "master code" for the purposes to make the directory controllable, as in cases when the "page access code" has been lost or forgotten, or when it has to be changed. In this case, however when the master code is used to open a page its contents is erased automatically before its been open. This way the privacy of the owner of the page will be protected. The "master code" is available to the prime owner of the telephone and is entered during the initial setup of the dialler.

If "calling party number" service is available, the telephone number of the incoming call is checked for match with the numbers in telephone directory memory for all pages, open or locked, and if such is found either only the name of the caller, or the name of the "owner of the page" or both are shown on the alphanumeric display. This will provide information not only in regard who is calling but also to whom this call could relate. If the display permits also the calling party telephone number will be displayed.

By switching from page to page with the page selector device without moving the inside page address selector the dialler will display on the alphanumeric display the information related to the currently selected page, like page sequential number and the additional alphanumeric page identifier. Any movement of the inside page address selector device, however, will cause the dialler to start displaying on the alphanumeric display the telephone number and "name" currently pointed by the inside page address selector device within the selected page.

The application of this telephone system is also very convenient for use in such office automation and home automation equipment as fax machines etc.

EMBODIMENTS OF THE INVENTION

The embodiment of a telephone dialler according to the present invention includes a CPU which controls all telephone system periphery and performs all algorithms to implement the system, a nonvolatile memory for storing the telephone directory (could be EEPROM, Flash ROM, battery backed up RAM or any other in circuit programmable memory) and permitting easy modification of the data, a standard telephone like keypad (with small modifications explained later and made in order to accommodate the input of some additional characters), data character display (LCD or any other similar) for displaying the contents of the telephone directory and means for scanning the contents of the telephone directory on the display and direct dialling using the data displayed on the display.

BRIEF DESCRIPTION OF THE DRAWINGS

The block diagram of the whole system has been sown on FIG. 1, forming one embodiment of the invention.

On FIG. 2 is shown an embodiment of the Address Generator of the telephone system, based on a potentiometer connected to one of the inputs of an A to D converter. The outputs of the A to D converter are connected to the parallel inputs of a shift register performing normalization of the result and outputting it to a temporary buffer (note, the shift register and the buffer could be implemented by software).

Figure 3:
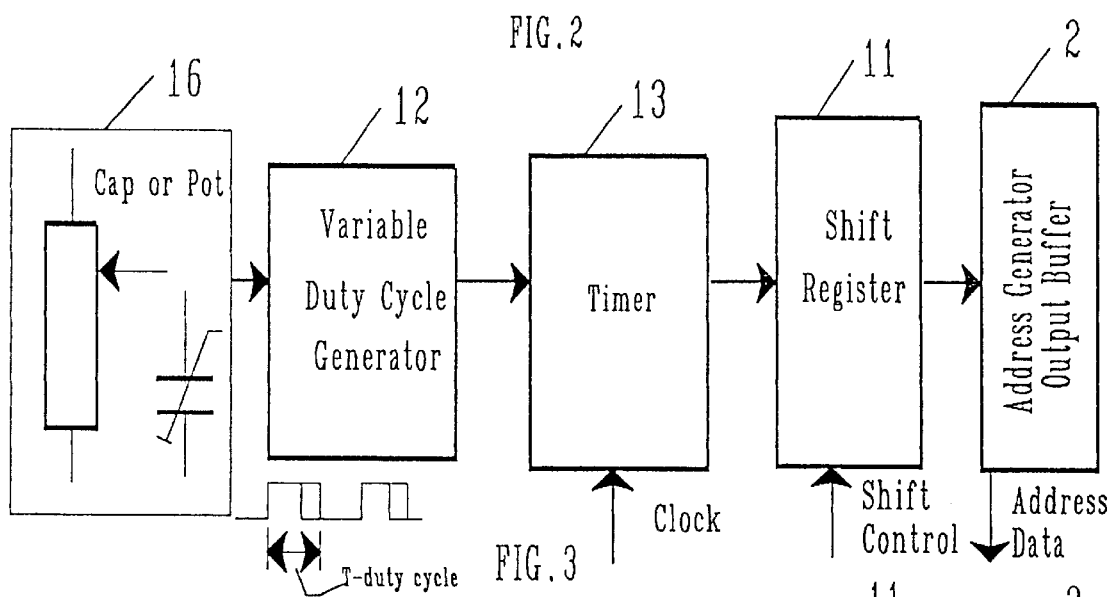

On FIG. 3 there is another embodiment of the Address Generator, based on a variable duty cycle generator and following it timer circuitry. The input controls change the generator duty cycle and the timer measures it and then transfers the result to a shift register for normalization and finally to a temporary buffer (note again, the shift register and the temporary buffer could be implemented by software).

Figure 4:
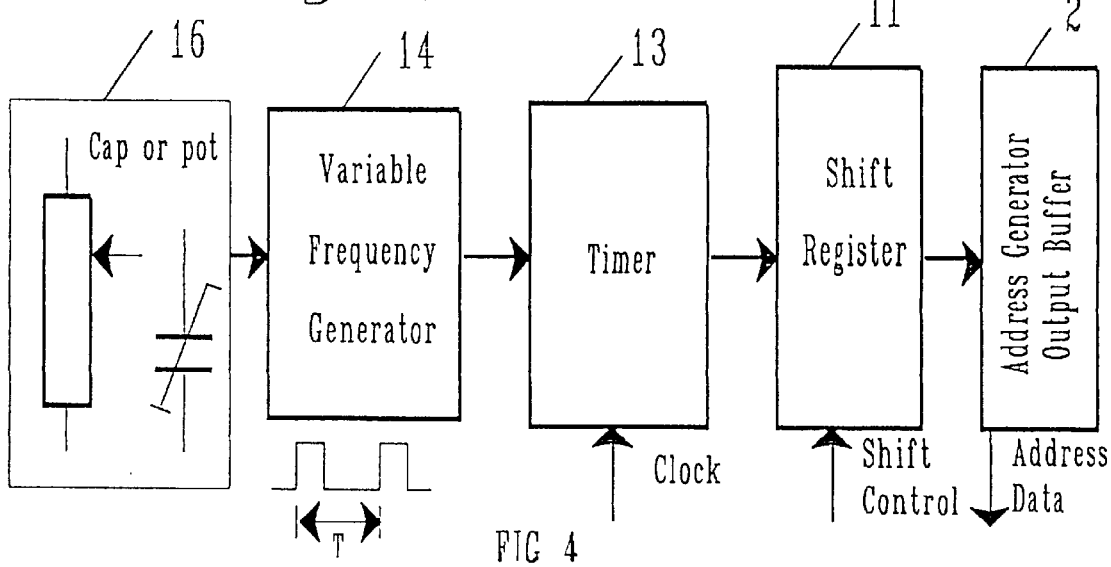

On FIG. 4 is shown yet another embodiment of the Address Generator based on a variable frequency generator and following it timer. The input controls vary the generator's frequency, which is then measured by the timer, normalized afterwards by a shift register and finally stored into a temporary buffer (again the shift register and the temporary buffer could be accomplished by software).

Figure 5:
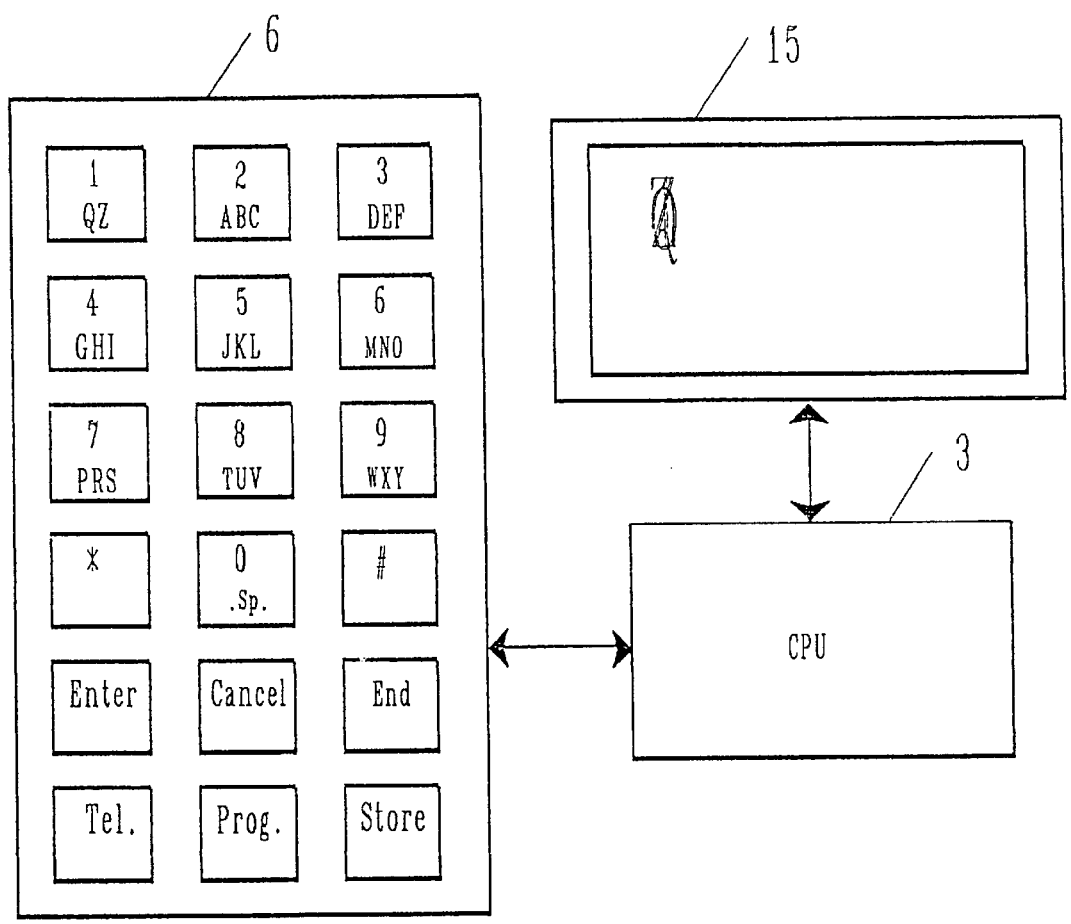

FIG. 5 shows the layout picture of the telephone system keypad, connected to the CPU and respectively the character display connected also to the CPU and displaying the result of three consequent depressings of the button "1" on the keypad. The consecutive characters are shown overlapped but actually at first depressing of "1" button an "1" will be displayed, at second depressing it will be replaced by "Q", at third—by "Z" and then the process will repeat until the button "enter" has been depressed, which will cause the current displayed character to be stored and the display cursor to move to the next position. The above sequence will be valid during entering the "name" information into the telephone directory memory. During normal dialling, shortcut dialling or entering the telephone number into directory the keypad behaves as a standard telephone keypad.

Figure 6:
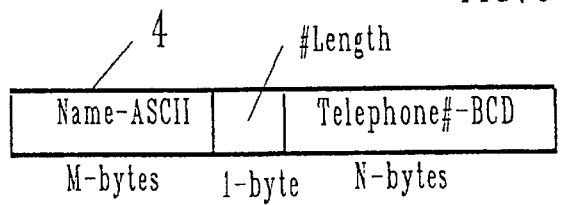

FIG. 6 shows an example of a structure of the temporary buffer between the telephone directory and the CPU. As it could be seen the "name" is stored in ASCII code and the "length" of the telephone number and the telephone number itself—in Binary Coded Decimal (BCD) code. This is done in order to save memory space. The number, sequence and contents of the blocks comprising the temporary buffer could be different depending on specific requirements to the system but should match the number and contents of the cells of the telephone directory.

Figure 7:
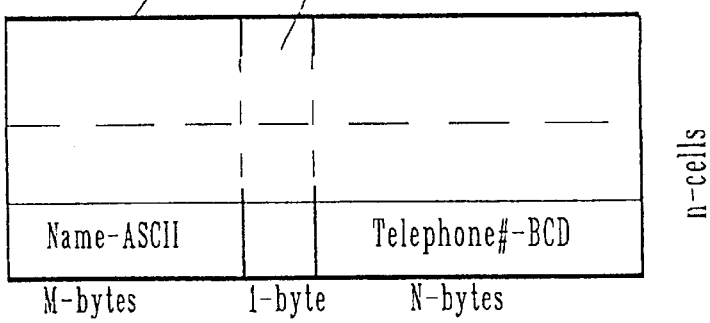

FIG. 7 shows an example of organization of the telephone directory. As it could be seen from this example the separate cells containing the name, telephone number and the length of the telephone number have equal length and should be in correspondence to the structure of the temporary buffer. This will make easier for the software to move the traffic both ways.

Figure 8:
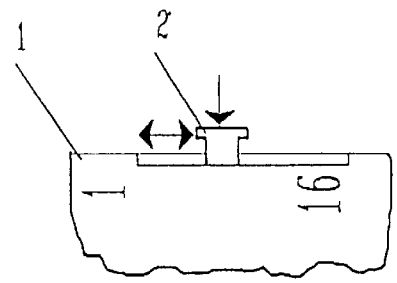

FIG. 8 shows an implementation for the page select and inside page address select controls.

Figure 9:
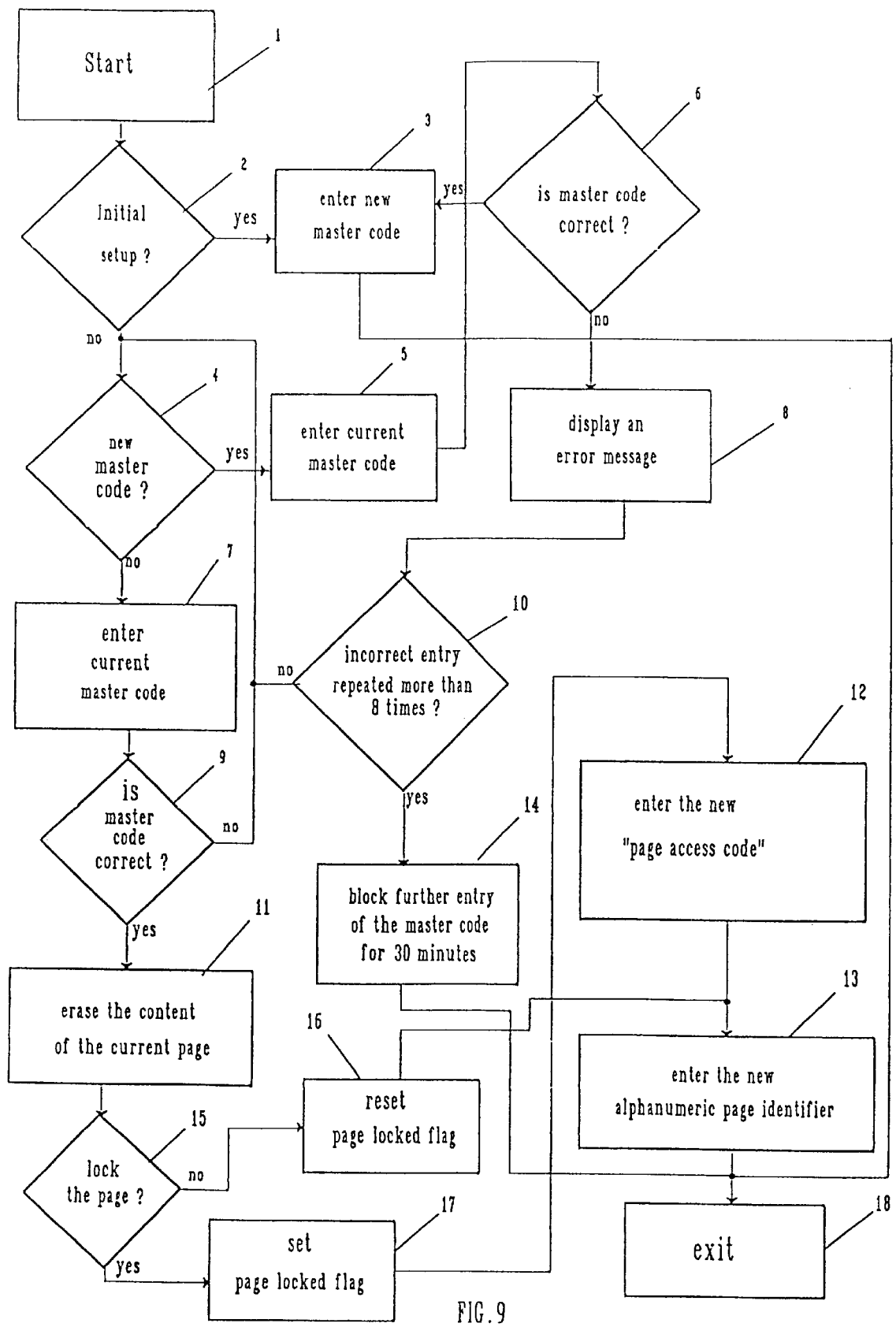

FIG. 9 shows a flowchart describing the algorithm for entering of the master code, for opening or locking of a given page, and finally for entering of a new page access code, as well as the additional alphanumeric page identifier.

Figure 10:
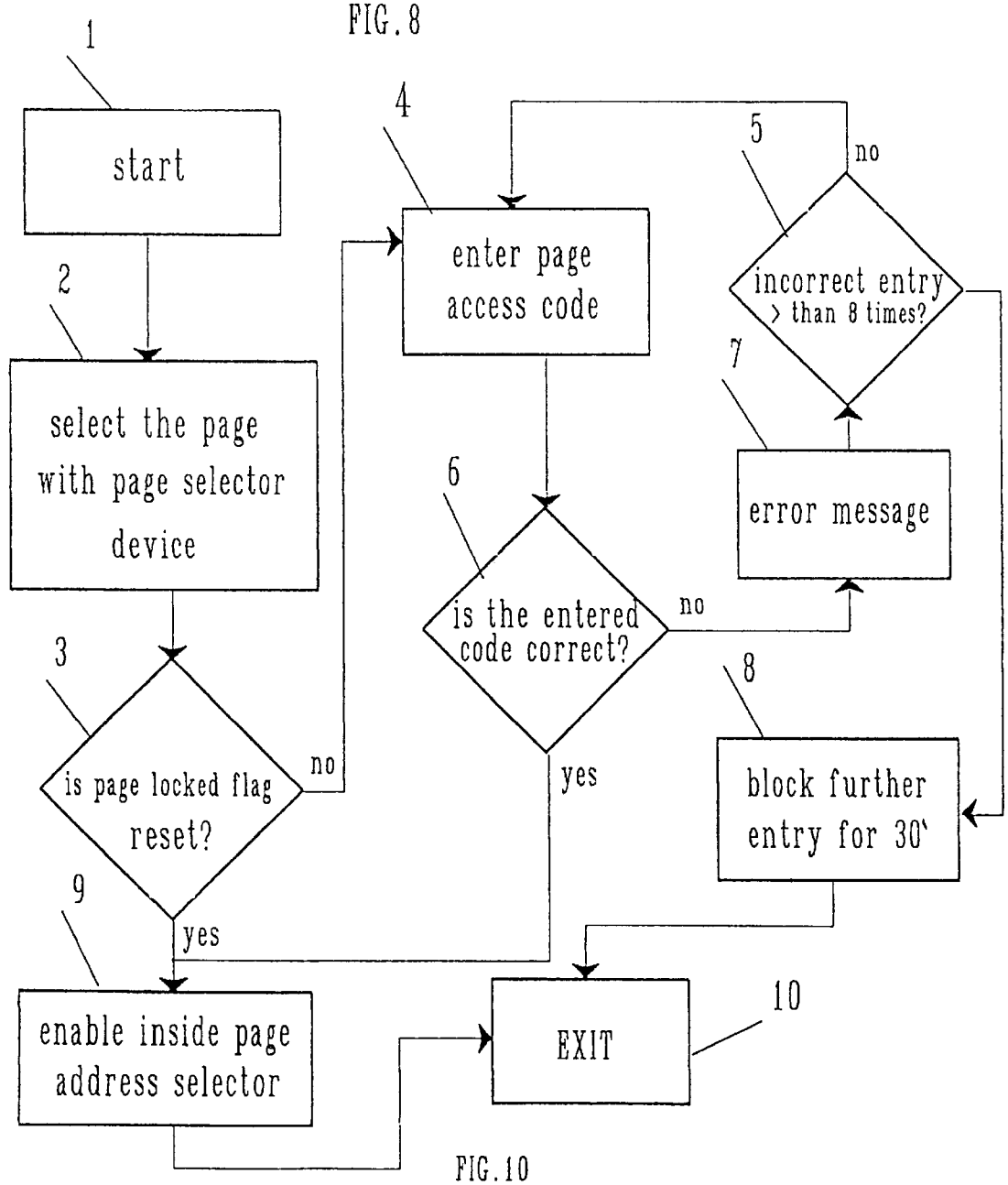
Figure 11:
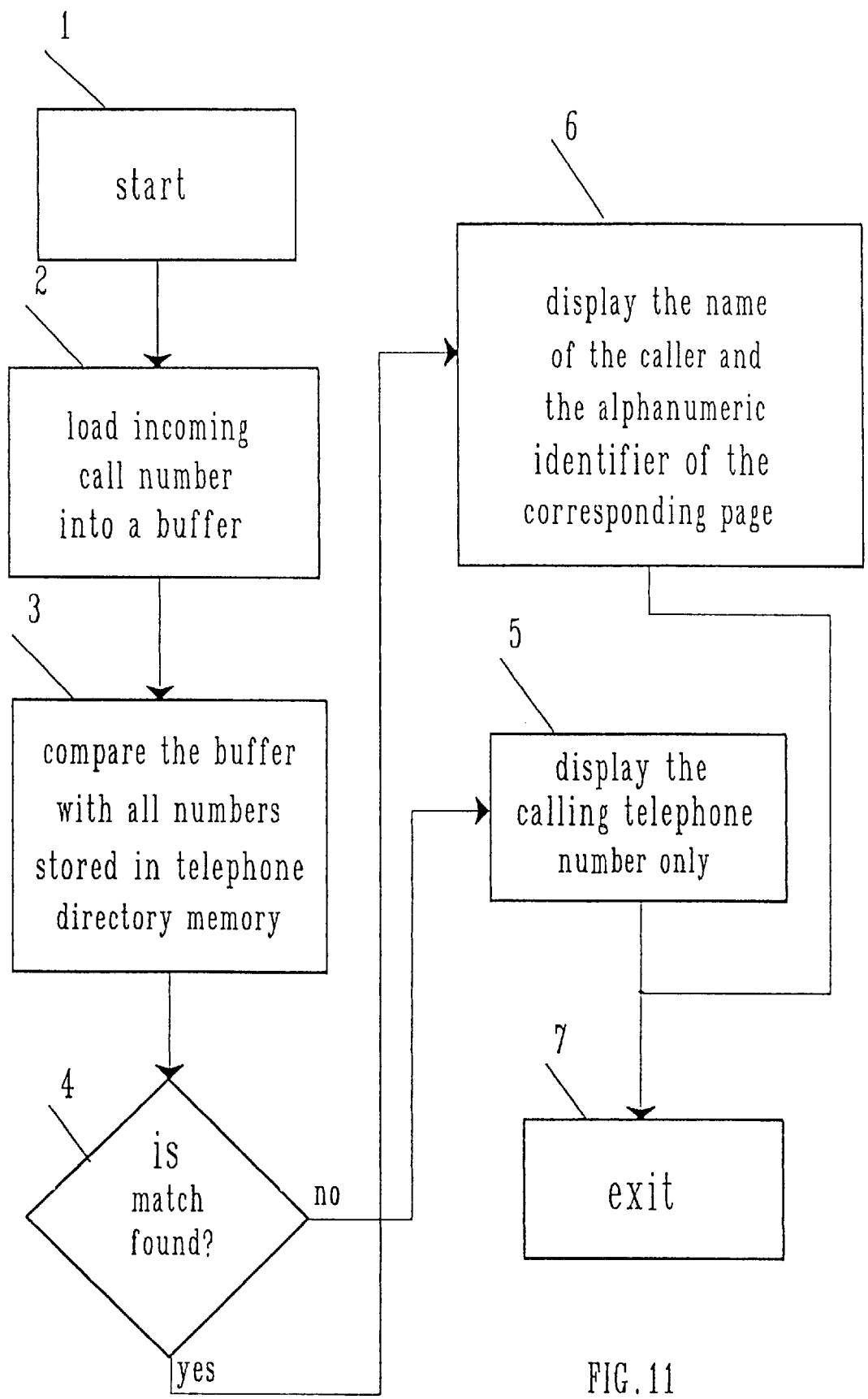

The page select algorithm is shown on FIG. 10, and the algorithm for displaying the name of the person to whom a page has been assigned in the case of the calling party number display mode is shown on FIG. 11.

Figure 12:
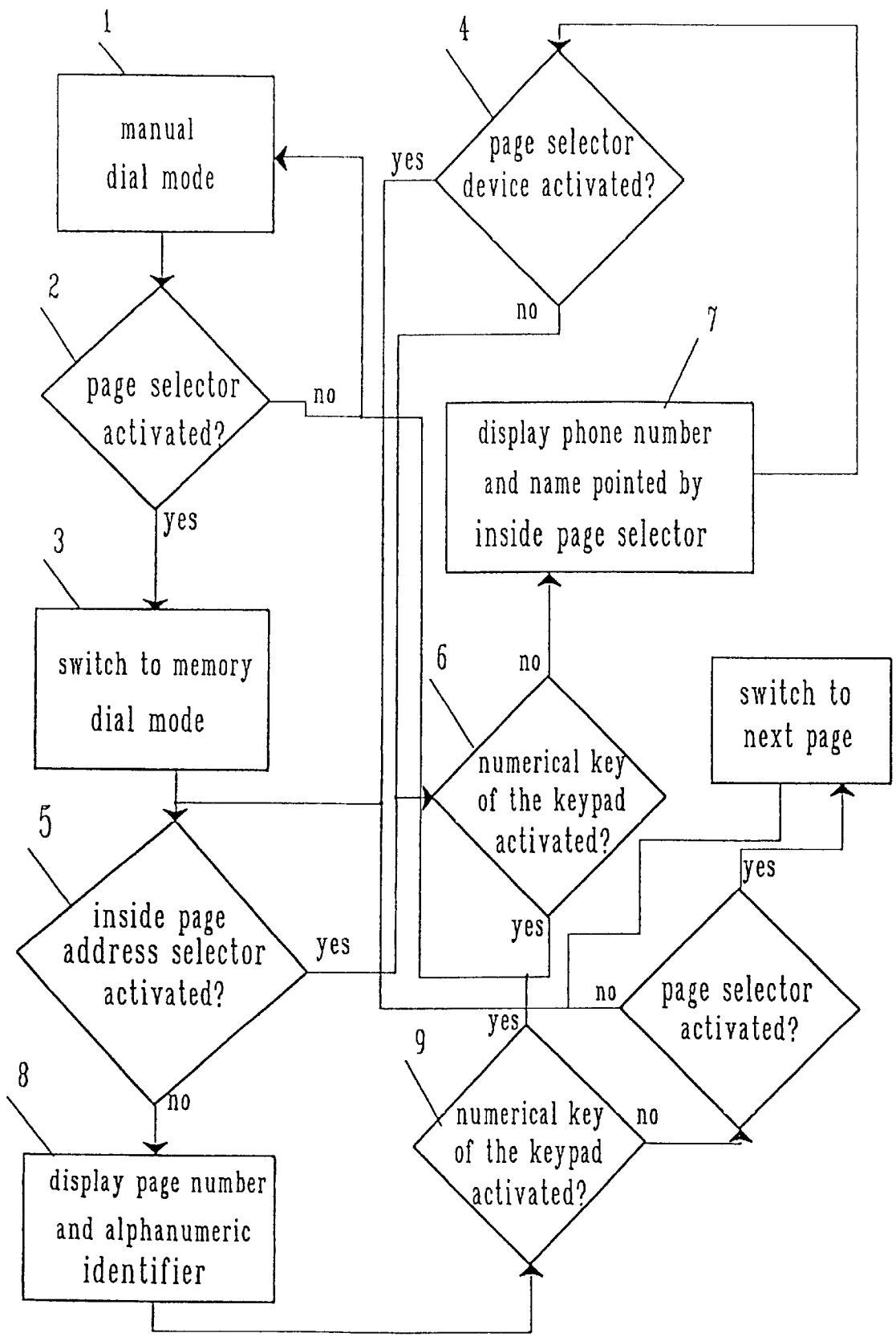

FIG. 12 is a flowchart of the algorithm for switching from manual mode of dialling to memory mode of dialling, as well as the opposite—from memory dialling to manual.

DETAILED DESCRIPTION OF THE DRAWINGS

Figure 1:
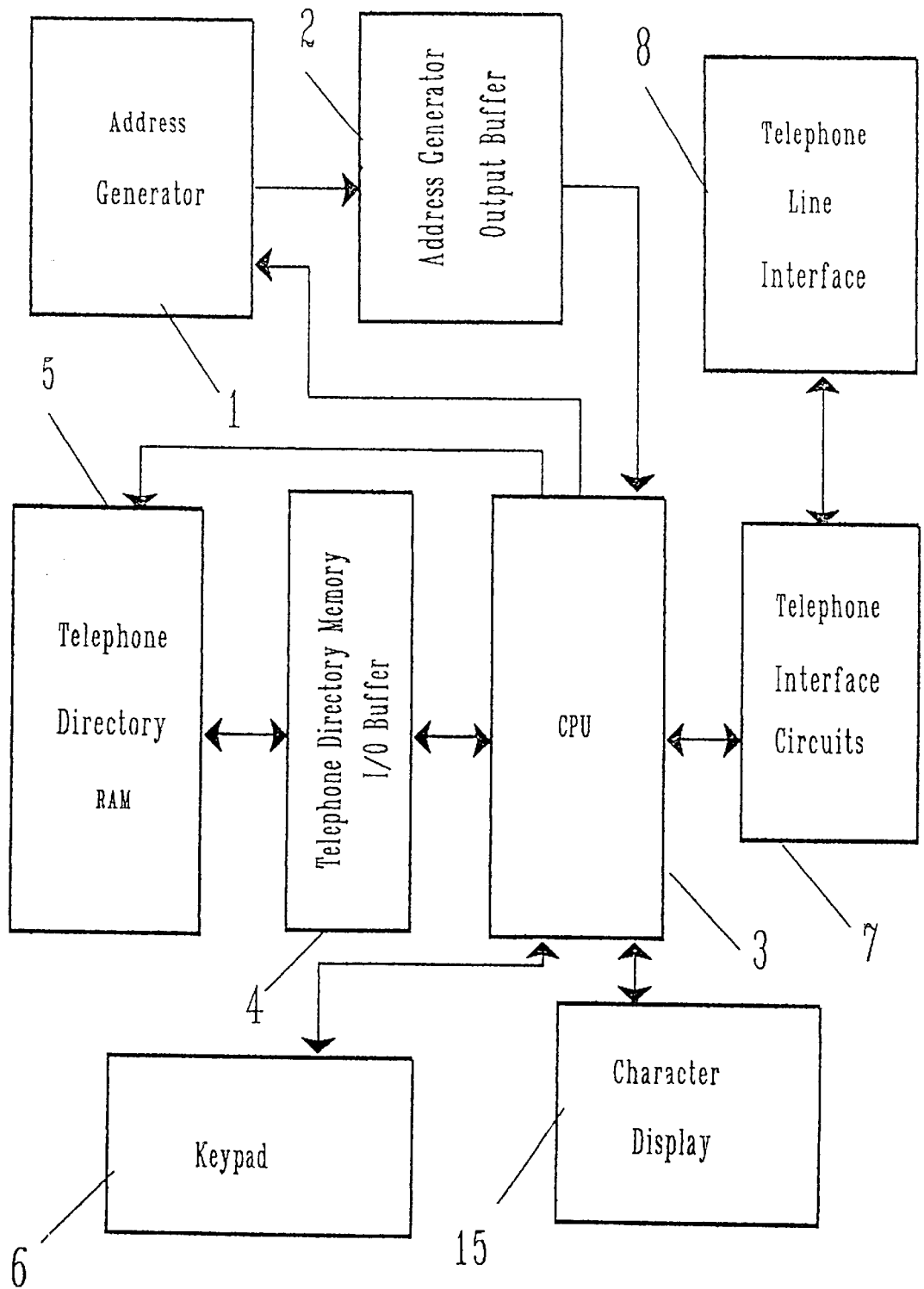

As shown on FIG. 1 the telephone system according to the present invention includes an address generator 1 connected to a buffer 2 on one side and receiving control signals from the CPU 3 on the other. The buffer 2 on its side is connected also to the CPU 3 The telephone directory RAM 5, which could be either a non volatile RAM, EEPROM or any other kind of non volatile memory permitting segment erasure and on line programmability, is connected with its I/O data bus to a temporary buffer 4 and receives control and address data from the CPU 3, which on its side is connected to a standard telephone like keypad 6, an alpha-numeric display 15 of suitable size and type and to telephone interface circuits 7, such as tone dialler, ring detector, call progress detector, a standard telephone handset circuit plus the handset itself, a speakerphone circuit etc. The telephone interface circuits 7 on their side are connected to a suitable telephone line interface 8 such as telephone transformer and relay etc.

The system functions as follows: the address generator 1, which could have different embodiments explained later, but in all cases is controlled by a single sliding or rotary type control, generates depending on the position of the control an address or part of an address (could be simply the sequential order of a cell from telephone directory), which is stored in the buffer 2; after depressing the button "tel." on the keypad 6, the CPU 3 takes the address from the buffer 2, reads the corresponding cell from the telephone directory 5, which contains the telephone number and other identifying alpha-numeric data, moves this data into the temporary buffer 4 and then displays it in suitable form on the alpha-numeric display 15. This process is continuous but discrete in time, so moving or rotating the control of the address generator 1 modifies the address in buffer 2 and in discrete suitably chosen moments of time the CPU 3 takes this address reads the corresponding cell of the telephone directory 5, moves the data to the temporary buffer 4 and display 15. This way just by moving the sliding or rotary control of the address generator 1 one could easily, fast and conveniently scan the contents of the telephone directory 5 on the display 15 keeping at the same time the currently displayed information into the buffer 4. If one presses in the mean time the button "tel." on the keypad 6 the displayed number is outputted by the CPU 3, from the buffer 4 to the telephone interface circuit 7 and from there through the telephone line interface 8 to the telephone exchange. A variation of the above described way for scanning of the telephone directory memory 5 is performed following way—after depressing the appropriate control button the keypad 6 is switched into "name" mode, described in the next pages, but only for the first entered alpha-numeric character, and after that by activating the sliding/rotary control of the address generator 1 only those numbers from the telephone directory memory 5 are displayed on display 15 and moved to the buffer 4 for which the alpha-numeric supplementary data starts with the selected letter. In case of an incoming call (if the option is available) the system sends a request through the telephone interface circuits 7 and receives the calling party number which is stored in buffer 4 and then compared to the telephone numbers contained inside the telephone directory RAM 5 and if a match is found all the additional information is concatenated to the number data inside the buffer 4 and displayed on to display 15.

Figure 2:
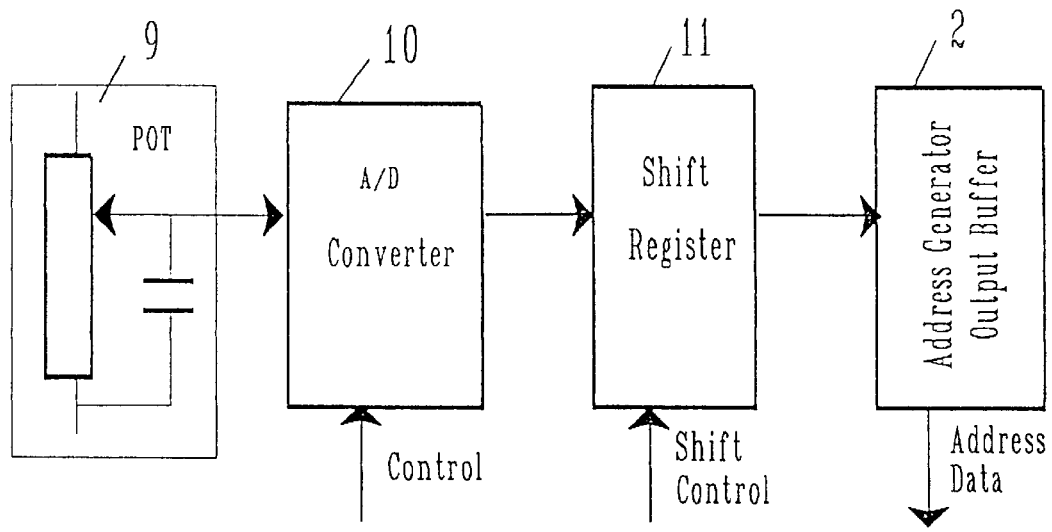

One possible embodiment of the address generator 1 is shown on FIG. 2. The variable voltage from the slider of the potentiometer 9 is fed to one of the inputs of the A to D converter 10 with a suitable resolution and accuracy. The transformed into digital code value of this voltage from the outputs of the A to D converter 10 is supplied to the parallel inputs of the shift register 11, where a logical shift right is executed under control of the CPU 3, depending on the A to D converter resolution 10 and the size of the telephone directory RAM 5. As an example if the A to D converter 10 has 8-bits resolution and the telephone directory RAM 5 has 16 cells, the data inside the shift register 11 will be shifted four bits to the right. After that from the outputs of the shift register 11 data is moved to the buffer 2 and is used further by the CPU 3 for generation of an effective address, adding it to the offset address of the telephone directory RAM 5, the CPU accesses a cell in the telephone directory RAM 5 which directly corresponds to a given position of the slider of the potentiometer 9, so, this way moving the slider causes the digit stored in buffer 2 to change in such a way that all addresses in telephone directory RAM 5 are scanned and a fixed given position of the potentiometer 9 corresponds always to a fixed cell inside telephone directory RAM 5.

Different embodiment of the address generator 1 is shown on FIG. 3. There a fixed frequency variable duty cycle generator 12 is controlled either by potentiometer or variable capacitor 16, which varies the duty cycle of the signal fed from its output to the input of a timer 13 measuring the width of the signal and loading the result to the parallel inputs of the shift register 11. The next steps are identical to that from FIG. 2. With a suitable choice of the duty cycle range and the frequency of the generator 12 and accordingly the resolution of the timer 13, this embodiment of the address generator 1 will meet any requirements regarding the size of the telephone directory RAM 5.

Third variation of the address generator 1 is shown on FIG. 4. Here the main difference from FIG. 3 is that the position of the controls 13 control a variable frequency generator 14 and the timer 13 is in period (frequency) mode of measurement. Here too by properly choosing the frequency range of the generator 14 and the resolution of the timer 13, a wide range of telephone RAM 5 could be reliably accessed.

FIG. 5 shows some particularities of the keypad 6 and the way the data is interpreted by the CPU 3 and displayed on the alpha-numeric display 15 during "name" programming mode, eliminating this way the need for an alpha-numeric keyboard. When in program mode to enter the name of the person, after first depressing of a given push button the keypad 6 output is interpreted by the CPU 3 as the digit marked on it, and it is displayed same way on the alpha-numeric display 15, second depressing of the same button is interpreted by the CPU 3 as the first character marked on the push button bellow the digit and accordingly replaces the digit on the display 15 and its ASCII code is stored into buffer 4; third depressing is interpreted as the second character bellow the digit and next depressings of the same button are interpreted as next marked characters and after the last again the digit is displayed and so on until the "enter" button on the keypad 6 is depressed which leaves last character into buffer 4 and moves to next position for entering next character of the name till the depressing of the "end" button, the maximum allowed number of characters has been exceeded, or the button "cancel" has been depressed. In first two cases the mode automatically switches to entering the telephone number and already the keypad 6 is interpreted by the CPU 3 as a normal only digital keypad. Only the digits corresponding to the depressed buttons are displayed on the display 15 and accordingly their codes stored in buffer 4. In the third case the buffer 4 and the display 15 are cleared and the whole procedure starts from the very beginning. The entering of the telephone number is complete either after depressing the "end" button on the keypad 6 or exceeding the allowed length for the telephone part of the buffer 4. In both cases the "length" is automatically stored in the appropriate location in buffer 4. Next procedure is to depress the button "store" on the keypad 6 and the contents of the buffer 4 is automatically stored by the CPU to a cell in the telephone directory RAM 5, currently pointed by the address contained in the buffer 2. The only difference from the standard keypad is the addition in the new keypad 6 of letters "Q" and "Z" bellow number "1" and—"." and space "SP" bellow "0", which was necessary to make them also available for programming.

The structure of the buffer 4 is explained on FIG. 6. It should be noted that the "name" information is in ASCII code and the "length" of the telephone number and the telephone number itself in BCD in order to save memory space, but they could be of any other suitable type.

FIG. 7 shows the internal structure of the telephone directory RAM 5. Rows are cells and as is shown the n-th address is displaced from the first by (n−1)*(M+N+1) bytes, where n—is the cell number, M—length of the "name" in bytes; N—length of the telephone number in bytes. So, the address increments from cell to cell by M+N+1 bytes. The structure of a row in telephone directory RAM 5 corresponds exactly to the structure of the buffer 4.

One embodiment of the combination of page selector and inside page address selector devices is shown on FIG. 8. By initial depression on the slider/push button control 1 the telephone directory memory is selected and page one (in other implementation—last selected page) contents can be scanned by sliding the control 1. Further depressions on the control 1 will switch consecutively to next pages.

A flowchart for initial setup, for change, and finally for regular use of the master code is shown on FIG. 9. At the very beginning when the request for master code has been issued either by depressing dedicated button or combination of buttons the CPU checks if it is initial setup 2, if it is an initial setup, a request to enter new master code 3 is issued by the system. After the new master code has been entered the system exits from master code entry mode of operation. On the second hand, if it is not an initial setup 2, there is another branch, asking if it is to enter a new master code 4, if the answer is yes, the system requests the entry of the current master code 5. If the entered code is incorrect the process repeats either until a correct master code has been entered, followed by the entry of the new master code 3 and exiting master code mode 18, or if the incorrect entry is repeated more than certain number of times 10, eight in this case, further entry of the master code is blocked for a certain amount of time 14, thirty minutes in this case, and the CPU exits from the execution of the algorithm 18. In case that the answer to the request for new master code 4 is no, the system asks again to enter the current master code 7. It checks if the entered master code is correct 9, if it is incorrect the action of the system is the same as in the case of the entry of new master code. If the entered master code is correct the system switches to the branch of the algorithm dealing with the parameters of the currently selected page. First thing the system does is to erase the content of the current page 11, thus privacy of the "owner" of the page is assured. Next choice is to keep the page locked with a new page access code or to open it. If the choice is to unlock it, the system resets the special page locked flag 16, asks to enter new alphanumeric page identifier 13 and exits 18. If however, the request is to keep the system locked, page locked flag is set 17, the system requests the entry of a new page access code 12, then the entry of the additional alphanumeric page identifier for this page 13, and exits 18 the algorithm.

The algorithm for page selection is described by the flowchart on FIG. 10. The page is selected by means of the page selector device 2, first thing the system checks for is if the page has been locked 3. If it is open the inside page address selector 9 is enabled and the system exits 10 the page selection algorithm. If the page is locked 3, system requests the entry of the page access code 4 for this page. The system then checks for incorrect entry 6, if this is the case the process is repeated, either until a correct entry, or the number of entries exceeds eight 5, as in this case. In the last case the system blocks further entry of the page access code 8 for this page, for a predetermined amount of time (30 minutes in this example). If the entered page access code 6 is correct the system enables the inside page address selector 9 and exits the execution of the algorithm 10.

FIG. 11 shows the flowchart for the calling party number algorithm. The incoming call number is loaded into a temporary buffer 2 and then compared by the means of the CPU with all numbers stored in the telephone directory memory 3, the CPU checks if a match is found 4. If there is no match, only the telephone number of the caller 5 is displayed on the alphanumeric display. If, however, there is a match, the system will display the name of the caller and the alphanumeric identifier of the page 6, where this number resides. This is a very convenient feature to identify not only who is calling, but also for whom is this call. The displayed information depends on the capabilities of the alphanumeric display, in one case it could be the name of the caller, the "name" of the person to take the call, the sequential number of the page and the calling party telephone number, but depending on the size of the display, only part of this information could be displayed, or displayed sequentially after depressings of a dedicated button for example.

FIG. 12 describes a convenient way to switch between manual dialling mode 1, and memory dialling mode 3. Let assume the dialler is in a manual dialling mode 1, where a telephone number is dialled manually by sequential depressings of numerical keys of the keypad. System checks continuously if the page selector device has been activated, if it is not the dialler stays in manual dial mode 1. If the page selector 2 has been activated, the system switches the dialler to memory dial mode 3, it checks further if the inside page address selector has been activated 5, if it is not it displays on the alphanumeric display the selected page sequential number and the additional alphanumeric identifier for this page 8, in another embodiment not shown in FIG. 12 the system will display page one sequential number and its alphanumeric identifier. It will stay this way checking if a numerical key of the keypad has been activated 9, if it is the dialler will switch back to manual dial mode 1, if there is no numerical key activated 9, the system will check if the page selector device is activated 10 to switch to another page, if it is it will switch to another page 11, then check if the inside page address selector is active 5, display the new page sequential number and alphanumeric identifier 8 and cycle this way. If the page selector has not been activated 10, the system will directly go to check if the inside page address selector 5 is active and stay cycling inside the branch, until the inside page address selector has been activated 5, the system checks again if a numerical key on the keypad has been activated 6, and if so switches to manual dial mode 1, if not it starts displaying the telephone number indicia pointed by the inside page address selector device 7.

While, the above described embodiments of the invention are the preferred ones, it is apparent to those skilled in the art that many other changes and modifications may be made without departing from the invention in its broader aspects. Therefore the intention of the claims is to cover such changes and modifications falling within the true spirit and scope of the invention.

The embodiments of the invention in which an exclusive property or privilege is claimed are defined as follows:

1. A telephone dialler comprising:
   a keypad to generate sequences of indicia corresponding to telephone numbers,
   an electronic alpha-numeric display device to present a display corresponding to a selected one of said sequences of indicia,
   a memory to store electronically said sequences of indicia and to provide a telephone directory,
   a central processing unit (CPU) coupled to said memory, said electronic display device, and said keypad,
   an address generator including a manually operable address selection device to permit a user to scroll through said stored sequences of indicia by selecting at least partial addresses for selectable ones of said stored sequences of indicia, said address generator being coupled to said CPU so that said at least partial addresses are communicated thereto,
   wherein said CPU is connected to receive said addresses, access said memory, and obtain stored sequences of indicia in response to manual operation of said address selection device, and to cause said electronic display device to present a display corresponding to ones of said stored sequences selected as a result of and corresponding to an amount of said manual operation so that a user can observe on said electronic display device the scrolling through data stored within said telephone directory,
   said telephone dialler being effective to dial a telephone number corresponding to a stored sequence that has been selected via said selection device.

2. The dialler of claim 1 wherein said memory is organized into selectable discrete pages, and wherein said address selection device further includes a page selection device for selecting among said discrete pages.

3. A method of dialing a telephone number using a telephone dialler having an electronic alphanumeric display device and an electronic telephone directory memory having stored therein data concerning parties who may be called, the method comprising the steps of:
   operating a manually operable address selection device of the telephone dialler a manually selectable amount to scroll through said stored data concerning parties who may be called,
   in an address generator coupled to said address selection device, generating at least partial memory addresses in response to said step of operating the address selection device,
   communicating said at least partial memory addresses from said address generator to a central processing unit (CPU),
   electronically accessing memory locations corresponding to said memory addresses received at said CPU,
   displaying, on the electronic alphanumeric display device, indicia corresponding to the stored data so that a user may view scrolling indicia in conjunction with and corresponding to said operating step, and
   selecting one telephone number having corresponding indicia displayed on said display device and automatically dialing said number.

4. The method of claim 3 wherein said address selecting device is displacement proportional and wherein said step of operating the address selection device includes displacing said device in proportion to an amount of scrolling desired by the user.

5. The method of claim 4 wherein said telephone directory memory is organized in discrete pages, and said step of operating a manually operable address selection device permits scrolling through and viewing stored contents of a designated memory page.

6. The method of claim 5 further including switching to a selected one of said memory pages by operating a page selection device.

7. The method of claim 3 wherein said method further includes selecting among a plurality of discrete memory pages.

8. A telephone dialler comprising:
   a keypad to generate a sequence of indicia corresponding to a telephone number;
   a page selection device;
   a memory to store said sequences of indicia to provide a telephone directory, said sequences of said indicia in said directory being collected into discrete pages, each of which may be selected for retrieval from said memory by use of said page selection device;
   an electronic display device to display sequences retrieved from said directory;
   a manually operable scanning control device to control the scanning of indica of said selected page on said electronic display device;
   a central processing unit (CPU) to access said directory to store and retrieve indicia therein in response to operation of said scanning control device, said CPU displaying at least one of said sequences on said electronic display device; and
   a manually operable selector to select one of said indicia on said display for dialling.

9. The dialler of claim 8 wherein the activation of said page selection device causes page identification data to be displayed on said display device.

10. The dialler of claim 8 wherein said manually operable control device controls the scanning of indicia of inside a selected page on said display and causes selected telephone number data within the current page to be displayed on said display device.

11. The dialler of claim 8 wherein said keypad contains buttons, the activation of any of which switches the dialler into a manual mode of operation, and
   wherein the activation of the page selection device or the scanning control device switches the dialler into a memory dial mode.

12. A telephone dialler operable in a dialling mode to dial a selected telephone number and in a programming mode to store a set of indicia comprising a telephone number and additional alphanumeric information in a telephone directory memory, said telephone dialler comprising:
   a telephone keypad having a plurality of push buttons each of which is associated with a respective alphanumeric set including a number and a respective set of alphabetic characters, a temporary buffer, an electronic display and a central processing unit (CPU) to store and retrieve information from the memory,
   said keypad, display and CPU being connected and controlled by firmware in such a way, that when being used to store a new set of indicia into the telephone directory memory, said keypad is operable in one of two programming functions, one of said functions permitting storage of additional alphanumeric information and another of said functions permitting storage of numerical only information,
   wherein in said alphanumeric storage function, depressions of the push buttons of the keypad are interpreted as follows:

upon first depressing a given push button, a code representative for a fist alphanumeric character marked on the push button is stored in said temporary buffer and said first alphanumeric character is displayed at a first location of the display, after each subsequent depressing of the same push button, a code representing successive alphanumeric characters of the respective set is stored in the buffer and said characters are displayed at said first location of the display, until after each of a plurality of alphanumeric characters of the set has been displayed at said first location, said first alphanumeric character will again be displayed at said first location, the alphanumeric character being left in the buffer upon depression of a designated enter button so that a next character can be displayed at a second location of the display and a code for the next character can be stored in the buffer, each successive alphanumeric character code being stored in a similar way until termination of the entry of alphanumeric characters, wherein in said numerical storage function, depressions of the push buttons cause codes corresponding to numbers associated therewith to be stored, wherein said memory includes a plurality of cells of the same structure, and wherein the data stored in a cell of the telephone directory memory and in said temporary buffet contains the telephone number and information about its length in Binary Coded Decimal and all other additional information is in ASCII code.

13. A telephone dialler operable in a dialling mode to dial a selected telephone number and in a programming mode to store a set of indicia comprising a telephone number and additional alphanumeric information in a telephone directory memory, said telephone dialler comprising:

a telephone keypad having a plurality of push buttons each of which is associated with a respective alphanumeric set including a number and a respective set of alphabetic characters, a temporary buffer, an electronic display and a central processing unit (CPU) to store and retrieve information from the memory, said keypad, display and CPU being connected and controlled by firmware in such a way, that when being used to store a new set of indicia into the telephone directory memory, said keypad is operable in one of two programming functions, one of said functions permitting storage of additional alphanumeric information and another of said functions permitting storage of numerical only information, wherein in said alphanumeric storage function, depressions of the push buttons of the keypad are interpreted as follows:

upon first depressing a given push button, a code representative for a first alphanumeric character marked on the push button is stored in said temporary buffer and said first alphanumeric character is displayed at a first location of the display, after each subsequent depressing of the same push button, a code representing successive alphanumeric characters of the respective set is stored in the buffer and said characters are displayed at said first location of the display, until after each of a plurality of alphanumeric characters of the set has been displayed at said first location, said first alphanumeric character will again be displayed at said first location, the alphanumeric character being left in the buffer upon depression of a designated enter button so that a next character can be displayed at a second location of the display and a code for the next character can be stored in the buffer, each successive alphanumeric character code being stored in a similar way until termination of the entry of alphanumeric characters, wherein in said numerical storage function, depressions of the push buttons cause codes corresponding to numbers associated therewith to be stored, and wherein said storing includes storing in discrete pages in the telephone directory memory.

14. A telephone dialler as claimed in claim 13, wherein said memory includes a plurality of cells of the same structure and the data stored in a cell of the telephone directory memory and also in said temporary buffer contains the telephone number and information about its length in Binary Coded Decimal and all other additional information is in ASCII code.

15. A telephone dialler as claimed in claim 13, wherein the entering of additional alphanumeric information is permitted to continue until the number of stored characters exceeds a predetermined value.

16. A telephone dialler as claimed in claim 13, wherein the entering of additional alphanumeric information continues until a predesignated enter button is depressed twice in succession without entering information.

17. A telephone dialler as claimed in claim 13, wherein the entering of additional alphanumeric information continues until a specially designated button for end of data is depressed.

18. A telephone dialler as claimed in claim 13, wherein if the combined length of the additional alpha-numeric data plus the corresponding telephone number is longer than the maximum length of the alpha-numeric display, then the displayed data is left justified starting with the alpha-numeric data and all digits in excess of the display length are truncated.

19. A dialler according to claim 13 wherein the keypad is conditioned to operate in said alphanumeric storage function when using the dialler for entering alphanumeric characters into memory and said numerical storage function is selected upon completion of entry of alphanumeric characters.

20. A dialler according to claim 18 wherein completion of the entry of alphanumeric characters is indicated by depression of a predesignated button.

21. A dialler according to claim 18 wherein completion of entry is determined by the number of characters stored exceeding a predetermined value.

22. The telephone dialler according to claim 13 wherein said first alphanumeric character comprises a number and wherein said successive alphanumeric characters comprise alphabetic characters.

23. A telephone dialler, including a keypad, a central processing unit (CPU), a telephone directory memory, a telephone directory I/O memory buffer, an electronic alphanumeric display, and a calling party number decoding circuit, wherein the keypad includes a plurality of push buttons each of which is associated with a respective alphanumeric set including a number and a respective set of alphabetic characters, and additional data to be associated with a telephone number is input in a memory buffer by successively depressing a push button until a desired alphanumeric character is selected, and then depressing a designated enter button so that the selected alphanumeric character is stored in the memory buffer and a next alphanumeric character can then be input in the same fashion, and after input of the desired additional data into the memory buffer is completed the data is transferred from the memory buffer into the telephone directory memory, wherein a telephone number provided by a telephone service provider for an incoming call is stored in said telephone directory memory I/O buffer and compared by means of the CPU with numbers stored in said telephone directory memory, and wherein, if a match is found, then additional data corresponding to the calling party number is loaded by means of the CPU from the telephone directory memory into said telephone directory memory I/O buffer and the information is displayed on the alphanumeric display.

24. The dialler of claim 23 wherein, if a match is found, said CPU causes said additional data to be displayed on the alphanumeric display during the incoming call.

25. A telephone dialler comprising:

a keypad to generate sequences of indicia corresponding to telephone numbers, an electronic display device to present a display corresponding to a selected one of said sequences of indicia, a memory to store said sequences of indicia and to provide a telephone directory, a central processing unit (CPU) to access said memory, said CPU including an internal address register, a manually operable address selection device to select one of said stored sequences of indicia, said address selection device including an address generator output buffer to store a selected address value for subsequent transfer to said CPU internal address register for access to the telephone directory memory, and a value generator to vary the selected value in the address generator output buffer, the change in selected value corresponding to a displacement of the selection device, wherein said CPU is connected to receive said stored sequences of indicia in response to manual operation of said address selection device, and to cause said display device to present a display corresponding to ones of said stored sequences selected as a result of said manual operation, so that a user can observe on said display device the scanning through data stored within said telephone directory, said telephone dialler being effective to dial a telephone number corresponding to a stored sequence that has been selected via said selection device.

26. A telephone dialler as claimed in claim 25, wherein the manually operable address selection device comprises:

an analog to digital converter (ADC) connected with its input to a tap of a potentiometer connected between ground and a voltage reference to provide a variable input voltage to said ADC;

wherein digital outputs of the converter are connected to the inputs of the address generator output buffer, whose outputs communicate with said CPU, said converter receiving its control inputs from said Central Processing Unit.

27. A telephone dialler as claimed in claim 25, wherein the manually operable address selection device comprises:

a variable duty cycle generator connected on one side to a variation control element and on the other to a timer in duty cycle measurement mode of operation, connected with its output to said address generator output buffer, wherein the duty cycle of the generator can be manually varied and is measured at preselected constant intervals by the timer, the digital value from the output of the timer being fed into said address generator output buffer for further use as an address value by said CPU.

28. A telephone dialler as claimed in claim 25, wherein the manually operable address selection device comprises:

a variable frequency generator connected on one side to a variation control element having its outputs connected to a timer operating in frequency measurement mode, said timer being connected with its outputs to said address generator output buffer;

the frequency of the generator being manually variable and being measured at preselected constant intervals by said timer;

the digital value from the output of the timer being fed into said address generator output buffer for further use as an address value by the CPU.

29. The dialler of claim 25 wherein said memory is organized into selectable discrete pages, and wherein said address selection device further includes a page selection device for selecting among said discrete pages.

30. A method of programming a telephone dialler to store a telephone number and related additional alphanumeric information in a telephone directory memory, said telephone dialler having a telephone keypad having a plurality of push buttons each of which is associated with a respective alphanumeric set including a number and a respective set of alphabetic characters, the dialler also including an electronic display and a central processing unit (CPU), the method comprising the steps of:

controlling said keypad, display and CPU to perform a first function of storing the related additional alphanumeric information, and a second function of storing only the telephone number, (a) wherein in said first function, upon first depressing a selected push button, a code representative of a first alphanumeric character corresponding to the selected push button is stored in a temporary buffer and the first alphanumeric character is displayed at a first location on the display, after each successive depressing of said selected push button, a code representing successive alphanumeric characters of the set corresponding to the push button is stored in the buffer and the character is displayed at the first location of the display, the first function including controlling the dialler so that after repeated depressions of a push button, said first alphanumeric character will again be displayed at said first location, leaving the code for a last-displayed alphanumeric character in the buffer upon a preselected event, the preselected event remaining the same regardless of whether two characters to be stored in immediate succession correspond to the same push button or to different push buttons, and storing codes for each successive alphanumeric character of said additional alphanumeric information in a similar way, so that said first function provides a uniform manner of choosing alphanumeric characters to be stored regardless of whether successive characters selected for storage correspond to the same push button; and (b) wherein in said second function, depressing the push buttons causes codes corresponding to numbers associated with the respective buttons to be stored, (c) wherein said telephone directory memory is organized into discrete memory pages and wherein said first and second functions include storing in a selected memory page.

31. The method of claim 30 wherein said preselected event comprises depressing a designated enter button.

32. The method of claim 30 wherein said memory and said temporary buffer includes a plurality of cells of the same structure, wherein said step of storing data into the temporary buffer includes storing the telephone number and information about its length in binary coded decimal and storing all other additional information in ASCII code into at least one cell of the temporary buffer, the method further including storing the data into at least one cell of the telephone directory memory in said binary coded decimal and said ASCII codes.

33. The method of claim 30 including storing additional alphanumeric information into said temporary buffer until the number of stored characters exceeds a predetermined amount.

34. The method of claim 30 including storing additional alphanumeric information into said temporary buffer until a predesignated enter button is depressed twice in succession without entering information.

35. The method of claim 30 storing additional alphanumeric information into said temporary buffer until a specially designated button for end of data is depressed.

36. A method of operating a telephone dialler according to claim 30 wherein the keypad is conditioned to operate in said first function when using the dialler for entering alphanumeric characters into memory and said second function is selected upon completion of entry of alphanumeric characters.

37. The method of claim 30 further comprising the step of causing the codes to be stored in said telephone directory memory after storing them in the buffer.

38. The method of claim 37 wherein said step of causing includes depressing a "store" button.

39. A method of operating a telephone dialler having a telephone directory memory I/O buffer, an electronic, alphanumeric display and a telephone directory memory, the method comprising the steps of:

in the telephone directory memory, storing alphabetic and numeric data concerning parties, receiving an incoming call, determining the telephone number of the incoming call based on caller identification data provided by the telephone service provider, storing said incoming call telephone number in the telephone directory memory I/O buffer, comparing the incoming call telephone number with numbers stored in said telephone directory memory, and if a match is found, then loading alphabetic data corresponding to the calling number from the telephone directory memory into the telephone directory memory I/O buffer and displaying said alphabetic information on the alphanumeric display.

40. The method of claim 39 wherein said step of loading comprises concatenating said alphabetic data from said telephone directory memory with said telephone number in said I/O buffer.

41. The method of claim 39 further including a step of requesting identification of the telephone number of the incoming call.

42. The method of claim 39 wherein the step of storing the incoming call telephone number precedes said step of comparing.

43. The method of claim 39 wherein the method further includes decoding the incoming call telephone number and the step of storing the incoming call telephone number includes storing the decoded number.

44. The method of claim 39 wherein said displaying occurs during the incoming call.

\* \* \* \* \*